(12) United States Patent
Crowther

(10) Patent No.: US 7,103,169 B2
(45) Date of Patent: Sep. 5, 2006

(54) COMMUNICATIONS (75) Inventor: Michael J Crowther, Felixstowe (GB)

(73) Assignee: British Telecommunications public limited company, London (GB)

( * ) Notice: Subject to any disclaimer, the term of this patent is extended or adjusted under 35 U.S.C. 154(b) by 529 days.

(21) Appl. No.: 10/221,211

(22) PCT Filed: Mar. 16, 2001

(86) PCT No.: PCT/GB01/01172

§ 371 (c)(1),
(2), (4) Date: Sep. 10, 2002

(87) PCT Pub. No.: WO01/76214

PCT Pub. Date: Oct. 11, 2001

(65) Prior Publication Data

US 2003/0039349 A1 Feb. 27, 2003

(30) Foreign Application Priority Data

Mar. 30, 2000 (EP) .............................. 00302691

(51) Int. Cl.
H04M 3/00 (2006.01)

(52) U.S. Cl. ................................. 379/265.01

(58) Field of Classification Search ............ 379/265.01, 379/265.03, 265.09, 266.01
See application file for complete search history.

(56) References Cited

FOREIGN PATENT DOCUMENTS

EP 501189 * 9/1992

OTHER PUBLICATIONS

Page 473—Newton's Telecom Dictionary, Jan. 1998.*

* cited by examiner

Primary Examiner—Creighton Smith
(74) Attorney, Agent, or Firm—Nixon & Vanderhye P.C.

(57) ABSTRACT

A call center associated with an intelligent network has no service-specific executable application software running on its operator positions. Instead, each computer stores a set of templates which define respective screen displays, including text display areas and text input areas, and also a set of corporate logos. When an intelligent peripheral of the network is not able to proceed with a call in accordance with an application, a failure notification is sent to the network, which reroutes, i.e. connects, that call to the call center and sends a message including an identifier for a template to be used by an operator position in generating a screen display. The operator interacts with the customer, obtains information and enters this in the text entry areas, sends a return message to the network, which then sends a message containing an identifier for a template to be used for the next stage of that application.

14 Claims, 5 Drawing Sheets

Fig. 5

COMMUNICATIONS

This application is the US national phase of international application PCT/GB01/01172 filed 16 Mar. 2001 which designated the U.S.

BACKGROUND OF THE INVENTION

1. Field of the Invention

This invention relates to methods of and apparatus for providing communications services, and particularly, but not exclusively, to nodes for use in, and call centres for use with, intelligent networks (INs).

2. Background of Related Art

IN techniques have been understood for some time to offer a flexible and possibly more cost effective route to the development and deployment of advanced telecommunications call handling services than traditional methods. Essentially, IN techniques effectively consist of the separation of call processing functions within a telephone exchange, or equivalent entity, from the service logic which provides the actual telecommunications service—such as "Freefone" type services typified by the 0800 numbering range in the United Kingdom.

BRIEF SUMMARY

According to a first aspect of the present invention there is provided a method of operating a node of a communications network, the method including responding to a call from a calling user encountering automatic processing difficulties by the steps of:
commanding the connection of that call to a call centre having operator positions, each of the operator positions storing a set of templates, and each of the templates comprising data for generating a respective screen display at a said operator position; and
sending from the node to the call centre a first message associated with that call and comprising data defining a selected one of said set of templates.

There may be included the step of sending from the node to the call centre first calling user-related information data for inclusion within the screen display corresponding to that selected template.

The first calling user-related information may be sent in said first message.

There may be included the steps of:
receiving from the call centre a second message associated with that call and comprising calling user-related information; and
processing said calling user-related information.

Preferably, there is included the step of sending from the node to the call centre a further message associated with that call and comprising data defining a further one of said set of templates selected in dependence upon the result of said processing.

According to a second aspect of the present invention there is provided a method of operating a call centre having operator positions, the method comprising the steps of:
storing at each of the operator positions a set of templates, each of the templates comprising data for generating a respective screen display at a said operator position;
receiving a call from a calling user;
selecting an operator position and connecting the received call to that selected operator position;
receiving from a node of a communications network a first message associated with that call and comprising data defining a selected one of said set of templates; and
generating at that selected operator the respective screen display corresponding to the selected template.

Preferably, there are included the steps of receiving from the node first calling user-related information, and generating that respective screen display including said first calling user-related information.

The first calling user-related information may be received in the first message.

There may be included the steps of receiving from the calling user second calling user-related information, and entering said second calling user-related information into text entry areas of that respective screen display.

Preferably, there is included the step of sending to the node a second message associated with that call and including at least said second calling user-related information.

According to a third aspect of the present invention there is provided a node for use in a communications network, the node being arranged to respond to a call from a calling user encountering automatic processing difficulties by
commanding the connection of that call to a call centre having operator positions, each of the operator positions storing a set of templates, and each of the templates comprising data for generating a respective screen display at a said operator position; and
sending from the node to the call centre a first message associated with that call and comprising data defining a selected one of said set of templates.

Preferably, the node is arranged to respond to receipt from the call centre of a second message associated with that call and comprising calling user-related information by processing said calling user-related information.

Preferably, there is included the step of sending from the node to the call centre a further message associated with that call and comprising data defining a further one of said set of templates selected in dependence upon the result of said processing.

According to a fourth aspect of the present invention there is provided a call centre arranged to store at each of a plurality of operator positions a set of templates, each of the templates comprising data for generating a respective screen display at a said operator position; and being arranged to
receive a call from a calling user;
select an operator position and connecting the received call to that selected operator position;
receive from a node of a communications network a first message associated with that call and comprising data defining a selected one of said set of templates; and to
generate at that selected operator the respective screen display corresponding to the selected template.

Preferably, the call centre is arranged to receive from the calling user second calling user-related information, to enter said second calling user-related information into text entry areas of that respective screen display, and to send to the node a second message associated with that call and including at least said second calling user-related information.

BRIEF DESCRIPTION OF THE DRAWINGS

A specific embodiment of the present invention will now be described by way of example with reference to the drawings in which.

DETAILED DESCRIPTION OF EXEMPLARY EMBODIMENTS

Before describing the Figures in detail, a brief description the functionality of some of the principal components of an intelligent network (IN) will be given as an aid to understanding of the present invention. The principal components of an IN include:—

- an operations and support systems (OSS) domain which realises external operations and support systems, including customer handling etc;
- a transport network (TN) domain which realises the telecommunications networks controlled from the platform; and
- a distributed service control point (SCP) platform which realises the functionality delivering advanced telecommunications call handling services, such as "Freefone", cashless services (Calling Card etc.).

The SCP connects to controlled telecommunications networks via an appropriate signalling means. For the public switched telecommunications network (PSTN), this is currently via a modification of ITU-T (formerly known as CCITT) No.7 signalling system (referred to as SS7) using the Intelligent Network Application Protocol. SS7 is a general purpose protocol and may be replaced by a special purpose protocol in the future, but this is not a significant matter for the purposes of the present invention.

SS7 signalling messages flow from a controlled switch of the PSTN, referred to as a service switching point (SSP), to a signalling termination which forms part of the SCP. In practice, the signalling between an individual SSP and the SCP passes via one or more intermediate signalling transfer points (STPs), also known as signalling point relays which enable the messages to be rerouted in the event of a failure in the signalling network—either within the transmission circuits used or the terminating equipment.

The SCP comprises a number of physical and logical functions required to deliver, manage and enable services to be realised. These functions include:—

- applications servers which provide the physical and logical functions realising the service logic;
- a network control signalling interface server, for example a SS7 server, which translates network signalling protocols into an application orientated protocol for use within the rest of the platform;
- an intelligent peripheral (IP) capability to provide the various special functions required within services, such as voice announcements, voice messaging and other such special resources;
- a data server capability to provide a managed data repository for all customer, service and management data associated with the platform;
- an OSS server to manipulate management data originating on the platform into a form suitable for the external OSS systems and vice-versa, thereby hiding the inherently distributed nature of the platform and simplifying external OSS;
- management systems for providing internal management of the platform;
- other servers, as may be required, to provide new functions, interwork with other telecommunications service providers etc;
- a collection of various physical computer systems interconnected via appropriate data communications services (e.g. a transmission control protocol/Internet protocol (TCP/IP) data communications network, for example, a local area network and/or wide area network); and
- a set of software mechanisms realising a distributed processing environment which enable executing computer programs to interact via the data communications services in a manner which is largely hidden from the application programmer, such as products conforming to the documentation produced by the Object Management Group (OMG) such as the Common Object Request Broker Architecture (CORBA).

The data communications network can be realised as an extended LAN, i.e. one which uses WAN elements to connect individual LANs, or by using a single LAN architecture depending on the number of computer systems required and the technology choice for the data network.

Figure 1:
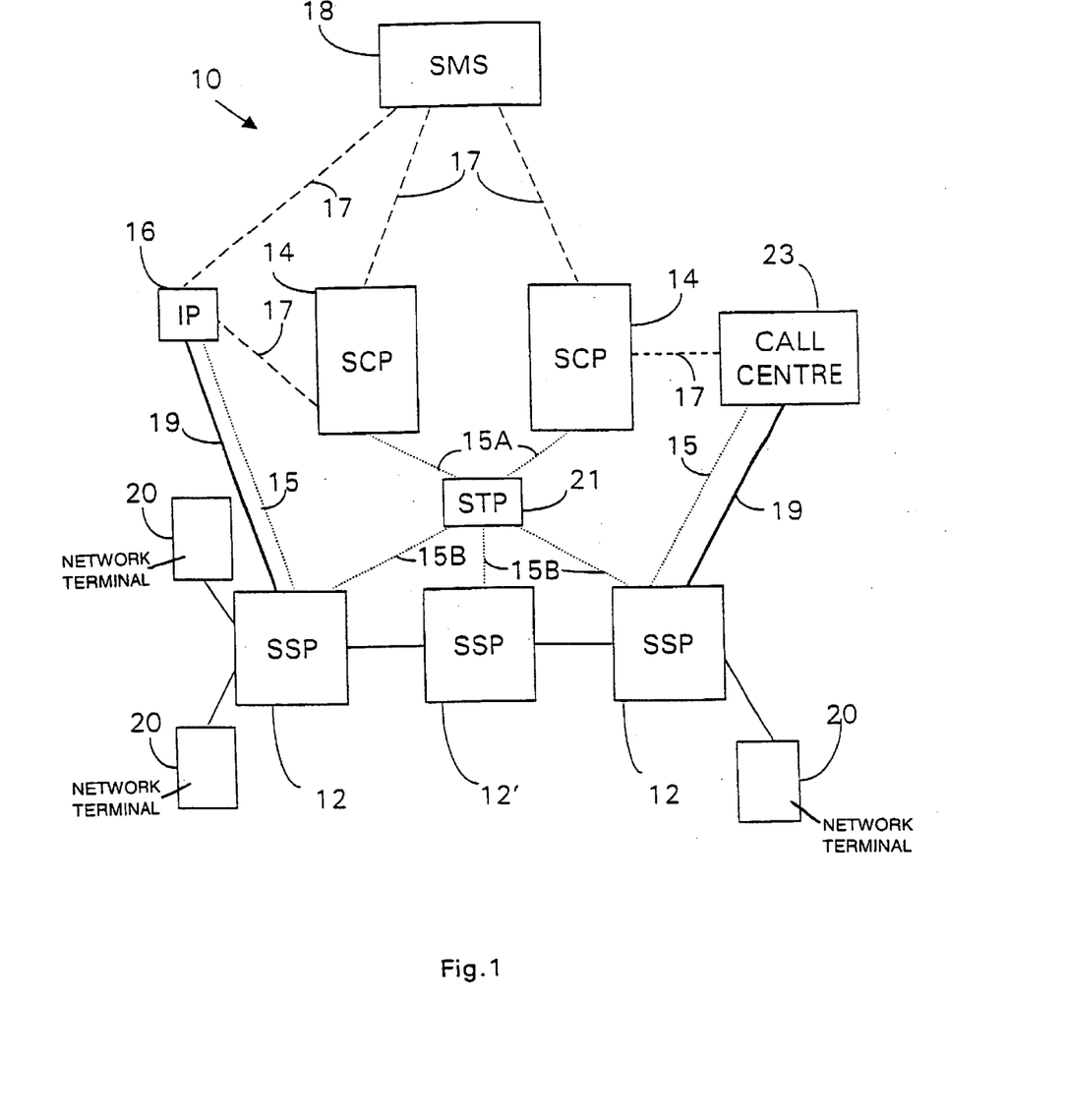
FIG. 1 is a schematic diagram of the structure of an intelligent network.

Beginning now the detailed description, there is shown in FIG. 1 an intelligent network (IN) 10 comprising a service switching function (SSF) comprising a plurality of service switching points (SSPs) 12, a service control function (SCF) comprising a plurality of service control points (SCPs) 14, a plurality of intelligent peripherals (IPs) 16, only one of which is shown, a service management system (SMS) 18, and a signalling transfer function (STF) comprising a plurality of signalling transfer points (STPs) 21, only one of which is shown.

A call centre 23 is coupled to each of the SCPs 14 via a respective operational command link 17 shown in dashed line, only one of which is shown, and to one of the SSPs 12 via a network signalling link 15, and a traffic data link 19 shown in continuous thick line.

As is known, some of the SSPs 12 act as local exchanges and are connected to a plurality of network terminals 20 via a local access network, not shown, and some of the SSPs 12', only one of which is shown, act as trunk exchanges.

For more information on intelligent networks in general the reader is referred to BT Technology Journal Vol.13. No.2. April 1995, the theme of which is network intelligence.

Each SCP 14 is coupled to an STP 21 via a respective network signalling link 15A, and each STP 21 is coupled to a respective plurality of SSPs 12 via respective network signalling links 15B. Each SCP 14 is also coupled to the SMS 18 via an operational command link 17. Each IP 16 is coupled to the SMS 18 and to an associated SCP 14 via respective operational command links 17 (also known as provisioning links), and to a respective one of the SSPs 12 via a network signalling link 15, and a traffic data link 19.

Figure 2:
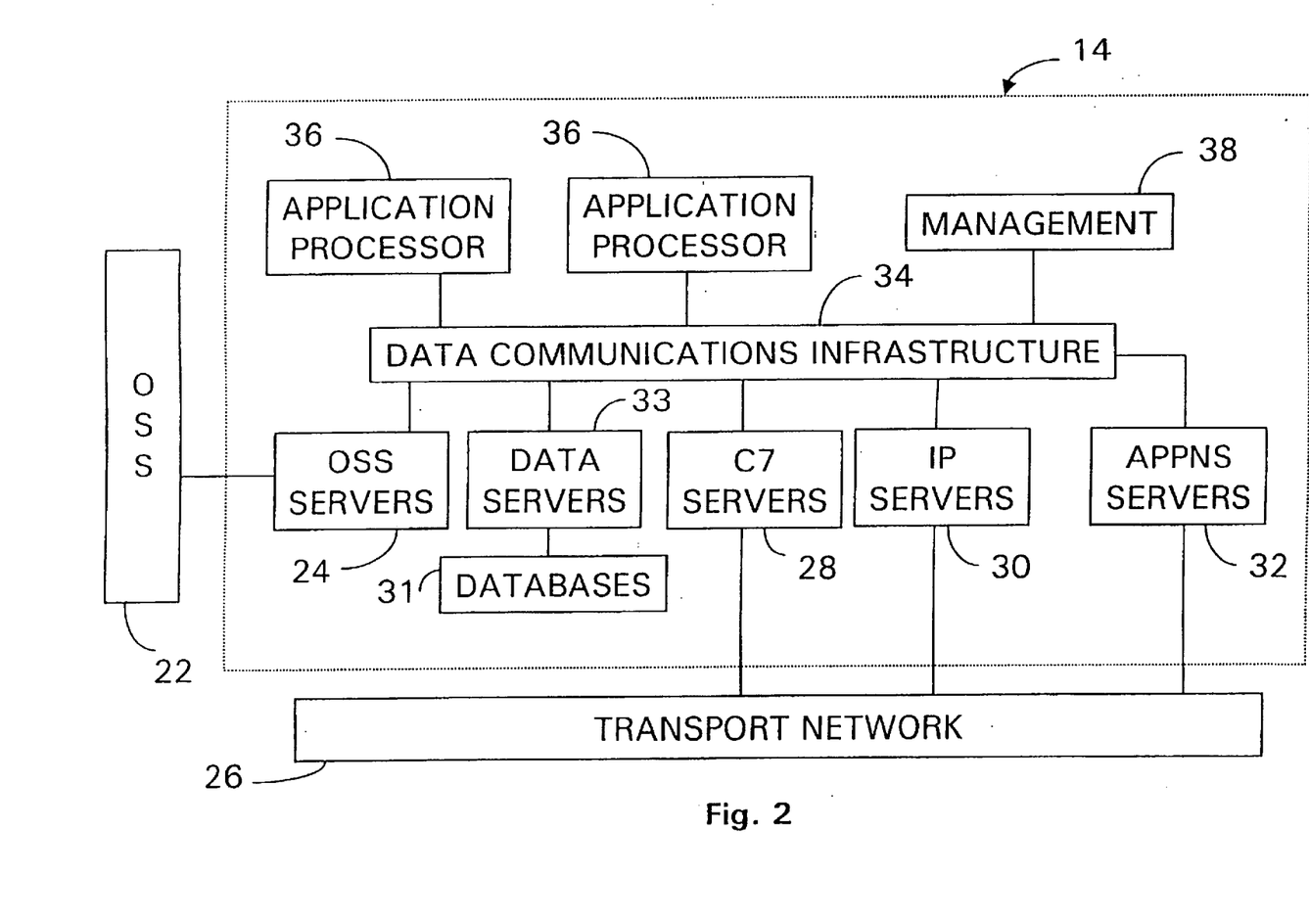
FIG. 2 is a schematic diagram of the structure of a service control point of the network of FIG. 1.

In FIG. 2, there is shown the software architecture of an SCP 14, which is based on a distributed processing environment using object oriented, multi-threaded processing software techniques. It will thus be understood that an individual object can support multiple threads of control and multiple messaging sessions with many other objects simultaneously.

The SCP 14 is shown coupled to the external OSS 22, which provides customer handling, via a plurality of OSS servers 24, and to an external transport network domain (TN) 26, i.e. the telecommunications networks controlled from the SCP 14, via a plurality of signalling interface servers (referred to as SS7 servers) 28 arranged to handle signalling messages conforming to the international signalling system known as ITU-T common channel signalling system No.7. The SCP 14 is also coupled to the TN 26 via a plurality of IP servers 30, and a plurality of applications servers 32.

The distributed processing environment of the SCP 14 comprises a plurality of databases 31, and a plurality of database servers 33 (also known as data servers), each server 33 being coupled to a respective plurality of the databases 33, and further comprises a data communications infrastructure (DCI) or network 34 coupled to the servers 24, 28, 30, 32 and 33, to a plurality of application processors (APs) 36 and to an SCP management system (MS) 38, and is realised by a set of software mechanisms (objects) conforming to the specification of an architecture known as common object request broker architecture (CORBA). This structure of the SCP 14 is well known in the art of intelligent networks.

One or more of the resident applications, also referred to as Services, running on the APs 36 is Card Service, and a specific example will be given of a use of a Chargecard service, also known as a Calling Card service, provided by British Telecommunications public limited company (BT), which includes the retrieval by a user, also referred to as a customer, of the service of messages recorded by a network-based message recording service (hereinafter referred to as "voicemail service"), the platform (not shown) for which includes a database for storing deposited spoken messages.

There now follows a description of the processes which occur for a typical call scenario for a message recording service provided by the node. Whilst there are many difference tasks that can occur, every call using the platform proceeds in a similar way to the following description.

Assume that the customer has subscribed to the voicemail service as part of the Chargecard service. When the customer has activated the voicemail service, calls to the customer are automatically connected by the network to the platform and any desired spoken messages (hereinafter referred to as "voicemail messages") are recorded for later retrieval by the customer, and the voicemail platform will send information about the voicemail messages (customer account number, caller's name) to the Chargecard application running on the APs 36 for storage in the databases 31. The Chargecard application increments a stored calls register (not shown separately) associated with that account number and stores the name in association with an index representing the current position of that voicemail message in a database of the voicemail platform.

When the customer wishes to find out if he has any voicemail messages waiting for him, he dials the service access digits for gaining access to the voicemail service and the PSTN routes the call (regardless of where it has originated on the network) to an SCP 14.

The Chargecard application controls the operation of the SCP 14 to perform the following key steps:—

- recognising the dialled service access digits for the voicemail service and, in response, creating and initialising a new Call Instance within a Shared Memory, constituted by part of the databases 31, and mapping the incoming call to a first IP Resource, say IP Resource #0 (the actual IP resource will be the incoming channel on which the incoming call appears and it will be the identity of this channel that will be mapped to the IP Resource #0 location of that new Call Instance);
- initialising the call's Charge Record by recording the incoming call or event with a time stamp in a Charge Record location of that new Call Instance;
- putting an Application Programming Interface (API) Incoming Call event on the call's API Events queue and queuing the new Call Instance as an Executable Call on an appropriate Service Instance;
- when decided by a Scheduler, not shown, sending to the Chargecard application the API Incoming Call Event from the Call Instance's API Events queue;
- selecting a free IP Resource, say Resource #3, in the Call Instance, commanding the reservation of a free resource and mapping its identity to the selected IP Resource;
- sending an API Connect message with reference to the IP Resource #0 (i.e. the incoming call) and the IP Resource #3 (i.e. the required resource);
- allocating, by means of a Switch Handler, not shown, a free Switch Dialogue Id to the Call Instance and commanding the connection of the call to the Resource #3;
- requesting that the Resource #3 play a recorded announcement to the customer, by sending, via an External API Resource Handler, not shown, an API IP Resource Command with the announcement type included; and
- leaving the resource to generate the announcement and proceeding to handle another call under the control of the Scheduler, this being done by means of an API Suspend command followed by an API Provide Instruction command.

In this scenario, this first API Resource Command is for generating a "Welcome" announcement and for collecting twelve digits representing the customer's account number and personal identification number (PIN).

The Resource #3 receives the application's command and starts generating the Welcome announcement, "Welcome to Voicemail. Please enter your account number and PIN." The Resource #3 is arranged to identify digits received at any time after the start of the Welcome announcement, and to stop generating the announcement at the time that the first of these digits is received and recognised.

On receipt of the first digit, Resource #3 sends to the Chargecard application an API Event message including the value of the first received digit. This message is queued on the API Events section of the Call Instance. This Chargecard application requires the first digit to perform an initial part of the account number processing, but not all applications involving account numbers require the first digit for initial processing. The dialogue between the application and the Resource #X has not yet finished, i.e. it remains open, so the Dialogue Id is permitted to remain associated with the Call Instance's IP Resource.

In alternative embodiments Resource #3 contains means to perform validation of the customer's account number and PIN, by accessing a database, not shown, of customer-related data and comparing a retrieved customer-associated PIN with the customer's dialled PIN. The term "dialled" includes both digits manually entered via a telephone instrument or equivalent, and digits spoken by the customer and recognised by Resource #3.

Normally, the customer will enter his eight digit account number and his four digit PIN within a timeout started at the beginning of the announcement, and when twelve digits have been collected the Resource #3 will send a Digits Collected message containing the digits, this message being associated with the same Dialogue Id as was sent to the Resource #3 with the command.

If the Resource #3 fails for whatever reason to collect twelve digits before the timeout, e.g. because of the customer's telephone was faulty, Resource #3 sends a Collection Failure message.

The present invention is concerned with the subsequent handling of calls which do not progress through the steps of the Chargecard application, for example with the reception at the SCP 14 of a Collection Failure message.

Figure 3:
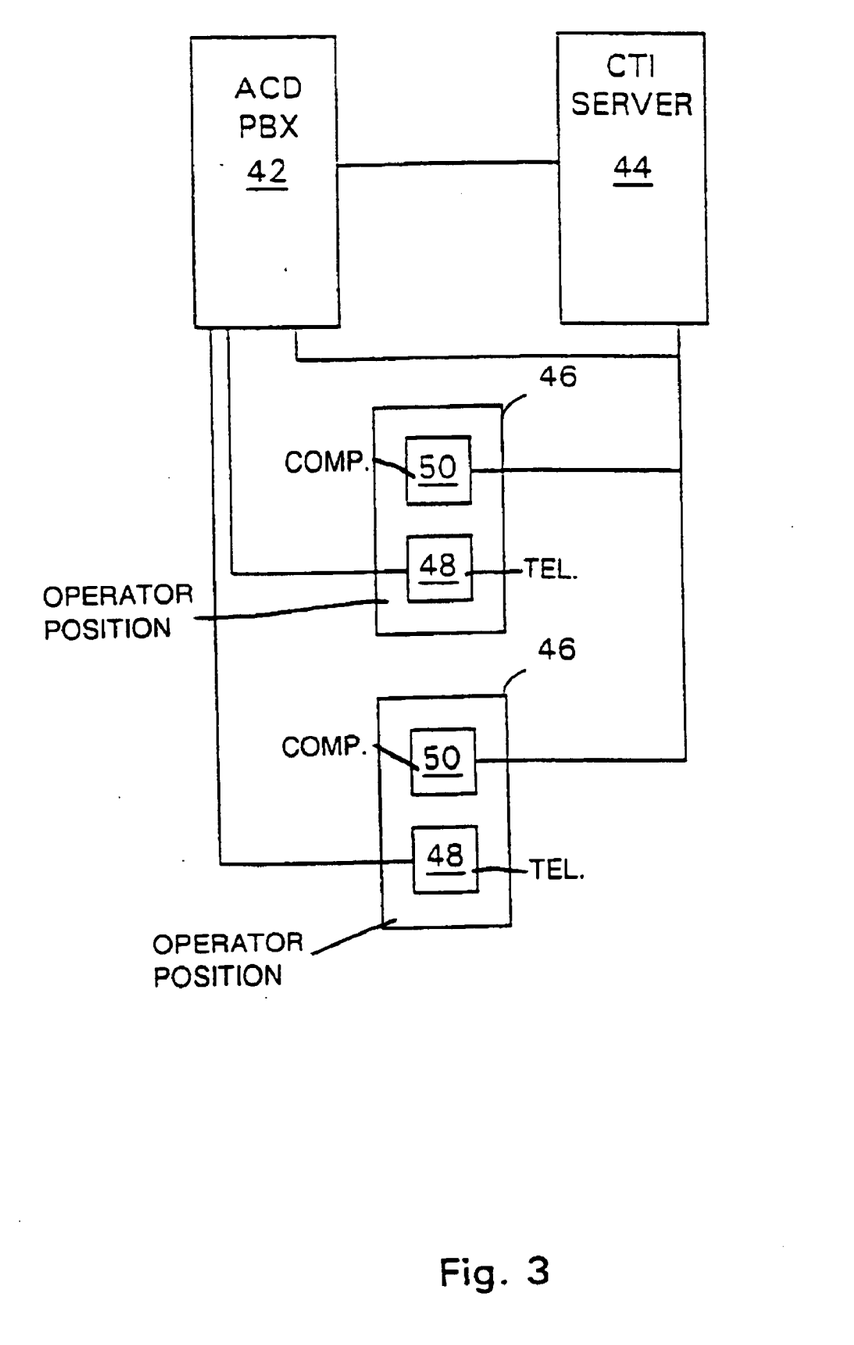
FIG. 3 is a schematic diagram of the structure of a call centre of a operations and support systems domain of the network of FIG. 1.

As shown in FIG. 3, the OSS 22 includes a call centre 40 comprising an Automatic Call Distribution Private Branch Exchange (ACDPBX) 42 including a Computer Telephony Integration (CTI) server 44 connected to a plurality of operator positions 46, each comprising a telephone 48 and a computer 50.

Figure 4:
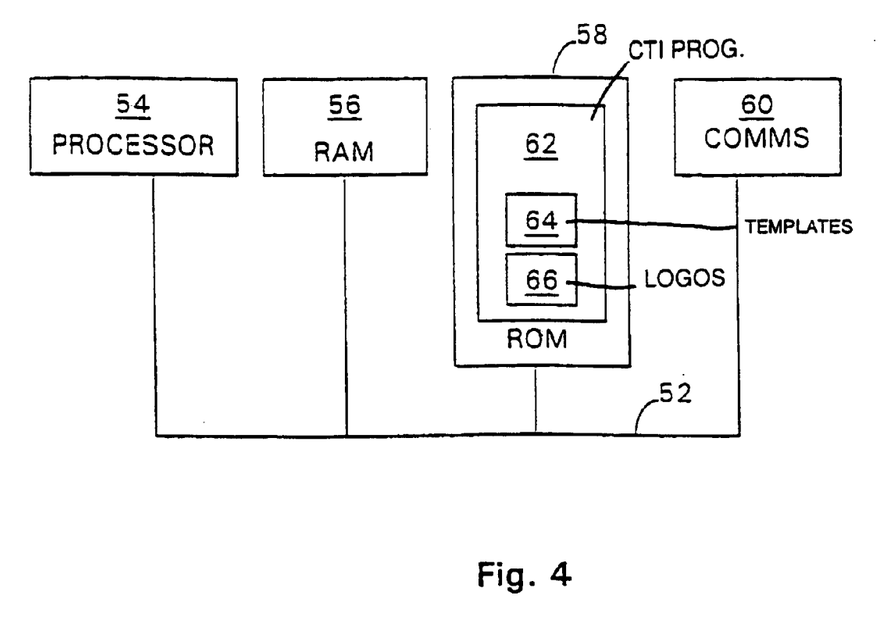
FIG. 4 is a schematic diagram of the structure of a computer of the call centre of FIG. 3.

As shown in FIG. 4, the computer 50, which acts as a CTI client, comprises an internal bus 52 to which is connected a processor 54, a RAM 56, a ROM 58, and a data communications stack 60. The ROM 58 contains an operating system program for controlling the processor 54, and also contains a CTI program 62 for the operation of the computer 50, a stored set of templates 64 and a stored set of company logos 66, each template and each company logo having a respective unique identifier.

Each template 64 comprises a set of data objects which together define the format of a respective Windows-based screen display, this format including background, areas for text display, boxes for text entry, areas for logo display, and the data objects including positioning information.

Upon receipt of the Collection Failure message, the Chargecard application proceeds to connect that call to the call centre 40, and to send a first template-defining message 68 (see FIG. 5) associated with that call and comprising data defining a selected one of said set of templates 64. In this scenario, the selected template 64 will be the first of a series for a dialogue between the customer and an operator at the call centre 40.

Figure 5:
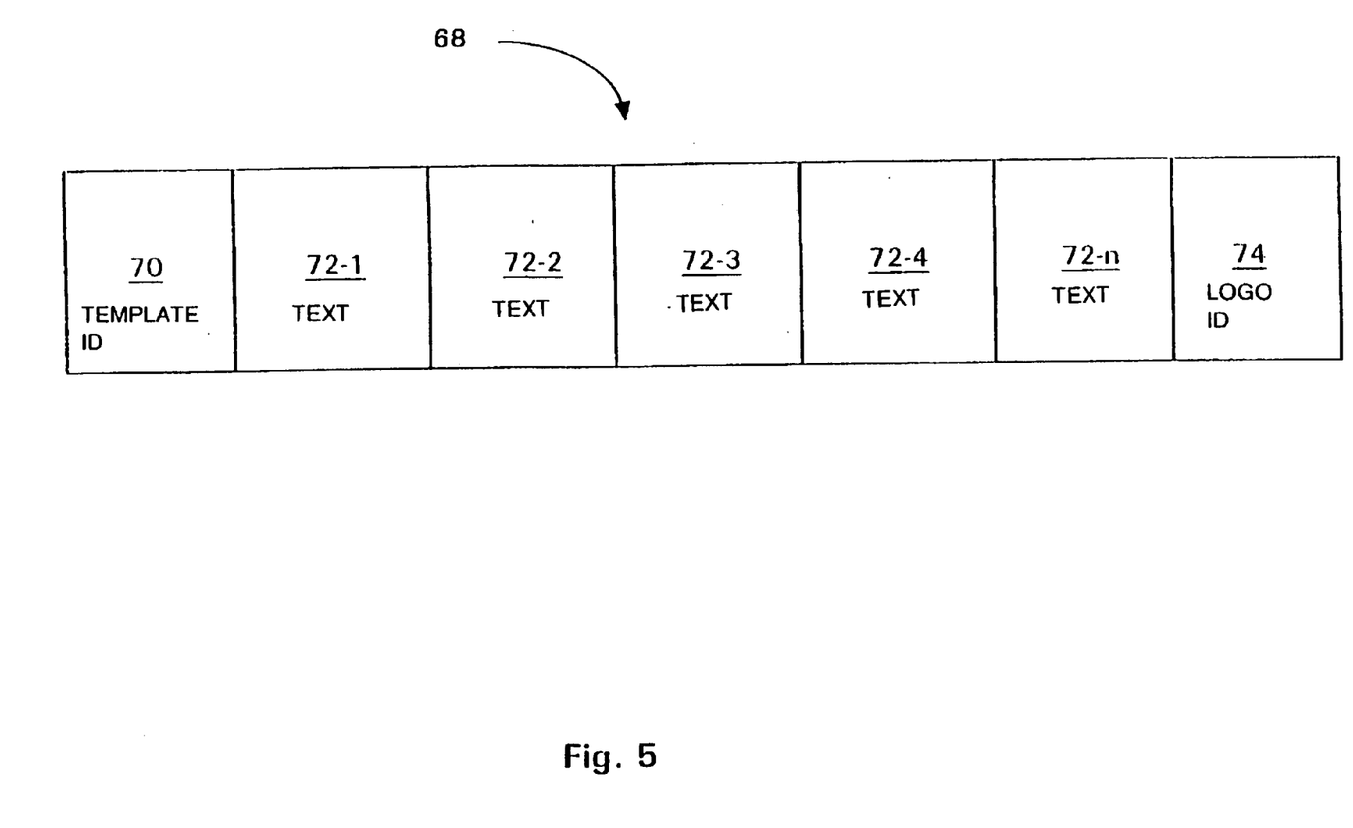
FIG. 5 is a schematic diagram of the structure of a template-defining message used in a method of the present invention.

The template-defining message 68, as shown in FIG. 5, comprises inter alia a field 70 containing an identifier for the template, i.e. the screen format to be displayed; one or more fields 72-1, 72-2, etc. containing respective texts for respective text display areas; and a field 74 containing an identifier for a company logo, in this case the BT logo. If the customer had been using a British Airways Calling Card then the identifier would have been that for a BA logo. The purpose of displaying a company logo is to supplement any text display identifying the particular card service so as to make it easier for the operator to recognise the provider of that service and be able to interact with the customer in accordance with that service provider's requirements.

The ACDPBX 42 receives the call, selects an operator position 46 which is active, i.e. at which an operator is logged on, and not currently engaged, connects that call to that selected operator position and sends the received template-defining message 68 to the computer 50 of that operator position 68.

The CTI program 62 responds to receipt of that template-defining message 68 by retrieving the set of data objects corresponding to the template identifier (content of field 70), and to the logo identifier (content of field 74), retrieving the text content of the fields 72-1, 72-2, etc., and generating a corresponding display.

If for some reason the Chargecard service was not able to collect any digits from the customer, then the normal minimum data sent to the call centre would be the customer's Calling Line Identifier (CLI), unless this had been withheld, and this would be sent in one of the fields 72-*n*. However, it may, be that the customer had been able to provide some information, e.g. an account number, and this would be sent in another of the fields 72-*n*. In a variant, the SCP 14 would use the CLI to access a database and retrieve the corresponding customer details, e.g. name, address, account number, PIN, account status, subscribed services, etc., and these would be sent in respective fields 72-*n* of the template-defining message 68.

The operator will interact with the customer, e.g. receiving by voice the customer's account number and PIN. If the call centre has a high level of sophistication, the voice input may be converted by a speech to text converter and entered automatically into respective text entry boxes of the screen display, with the operator overseeing that process to check that the correct data is entered in the appropriate boxes. Alternatively, the operator enters this information manually via the computer keyboard.

When the operator is satisfied that sufficient information has been obtained from the customer, he submits that screen to the Chargecard application. The CTI program 62 generates a first return message, constituting a second message of the present invention, containing the relevant contents of the boxes, both the data that was supplied in the first template-defining message and the data that was subsequently obtained by the operator, and sends that first return message back to the appropriate SCP 14. Alternatively, the first return message does not include the data that was supplied in the first template-defining message because this data is already stored in the call context for that call.

The Chargecard application retrieves the account number and PIN from that first return message, performs validation, and if validation is successful, proceeds to a next stage of the Chargecard service and sends to the call centre 40 the next template-defining message, including any service-related and/or customer-related information which the operator will need for this next stage.

An advantage of the present invention is that the operator positions do not run any service-specific logic software on the computers 50, i.e. all service-specific logic software is executed in the SCP 14, and this thus avoids the data management that would otherwise be needed to ensure that service-specific logic software running in the SCP 14 was operationally synchronised with service-specific logic software running in the computers 50 of the call centre 40. Furthermore, by removing service-specific logic software from the call centre 40 this reduces the time scale and costs involved in modifying the application software and in developing future operator applications. Also, the present invention enables close coupling of the operator's dialogue with the caller to the normal automatic call processing. In other words, after the operator has obtained the respective information required for completing any empty text boxes of a screen display, instead of handing back control of the call to the IP 16 so that the service can then proceed automatically, he can, for example, after collecting the caller's account number and PIN, merely request validation, in which case the node returns a further message to the operator (who has in the meantime maintained the voice connection with the caller), this message containing data indicating "card validated" together with the caller's account details and a further selected template identifier. The operator's computer 50 maintains a simple call state for that call, whereas the node maintains a complex call state including the call context.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

Windows is a registered trade mark of Microsoft Corporation.

What is claimed is:

1. A method of operating a node of a communications network, the method including responding to a call from a calling user encountering automatic processing difficulties by the steps of:

identifying a situation in which the calling user is encountering difficulties relating to automatic processing following the call from said calling user;

responding to said situation by commanding the connection of that call to a call centre having operator positions, each of the operator positions storing a set of templates, and each of the templates comprising data for generating a respective screen display at a said operator position; and sending from the node to the call centre a first message associated with that call and comprising data defining a selected one of said set of templates.

2. A method as claimed in claim 1, including the step of sending from the node to the call centre first calling user-related information data for inclusion within the screen display corresponding to that selected template.

3. A method as claimed in claim 2, wherein said first calling user-related information is sent in said first message.

4. A method as claimed in claim 1, including the steps of:

receiving from the call centre a second message associated with that call and comprising calling user-related information; and processing said calling user-related information.

5. A method as claimed in claim 4, including the step of sending from the node to the call centre a further message associated with that call and comprising data defining a further one of said set of templates selected in dependence upon the result of said processing.

6. A method of operating a call centre having operator positions, the method comprising the steps of:

storing at each of the operator positions a set of templates, each of the templates comprising data for generating a respective screen display at a said operator position;

receiving a call from a calling user;

identifying a situation in which the calling user is encountering difficulties relating to automatic processing following the call from said calling user;

selecting an operator position and connecting the received call to that selected operator position in the event that the situation is identified in which the calling user is encountering difficulties related to the automatic processing;

receiving from a node of a communications network a first message associated with that call and comprising data defining a selected one of said set of templates; and generating at that selected operator the respective screen display corresponding to the selected template.

7. A method as claimed in claim 6, including the steps of receiving from the node first calling user-related information, and generating that respective screen display including said first calling user-related information.

8. A method as claimed in claim 7, wherein said first calling user-related information is received in the first message.

9. A method as claimed in claim 6, including the steps of receiving from the calling user second calling user-related information, entering said second calling user-related information into text entry areas of that respective screen display, and sending to the node a second message associated with that call and including at least said second calling user-related information.

10. A node for use in a communications network, the node being arranged to respond to a call from a calling user encountering automatic processing difficulties by identifying a situation in which the calling user is encountering automatic processing difficulties following the call by said calling user and responding to said situation by commanding a connection of that call to a call centre having operator positions, each of the operator positions storing a set of templates, and each of the templates comprising data for generating a respective screen display at a said operator position; and sending from the node to the call centre a first message associated with that call and comprising data defining a selected one of said set of templates.

11. A node as claimed in claim 10, and being arranged to respond to receipt from the call centre a second message associated with that call and comprising calling user-related information by processing said calling user-related information.

12. A node as claimed in claim 11, and being further arranged to respond to receipt of the second message by sending from the node to the call centre a further message associated with that call and comprising data defining a further one of said set of templates selected in dependence upon the result of said processing.

13. A call centre arranged to store at each of a plurality of operator positions a set of templates, each of the templates comprising data for generating a respective screen display at a said operator position; and being arranged to receive a call from a calling user;

identify a situation in which the calling user is encountering difficulties relating to automatic processing following the call from said calling user;

select an operator position and connecting the received call to that selected operator position in the event that the situation is identified in which the calling user is encountering difficulties related to the automatic processing;

receive from a node of a communications network a first message associated with that call and comprising data defining a selected one of said set of templates; and to generate at that selected operator the respective screen display corresponding to the selected template.

14. A call centre as claimed in 12, and arranged to receive from the calling user second calling user-related information, to enter said second calling user-related information into text entry areas of that respective screen display, and to send to the node a second message associated with that call and including at least said second calling user-related information.

* * * * *